United States Patent
Liu et al.

(10) Patent No.: US 11,989,282 B2
(45) Date of Patent: May 21, 2024

(54) OPEN-SOURCE CONTAINER DATA MANAGEMENT

(71) Applicant: International Business Machines Corporation, Armonk, NY (US)

(72) Inventors: Da Li Liu, Beijing (CN); Qi Feng Huo, Beijing (CN); Yuan Yuan Wang, Beijing (CN); Lei Li, Beijing (CN); Yan Song Liu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 17/471,533

(22) Filed: Sep. 10, 2021

(65) Prior Publication Data
US 2023/0082851 A1 Mar. 16, 2023

(51) Int. Cl.
G06F 21/53 (2013.01)
G06F 9/455 (2018.01)
G06F 21/57 (2013.01)
G06F 21/60 (2013.01)
H04L 9/30 (2006.01)

(52) U.S. Cl.
CPC .......... *G06F 21/53* (2013.01); *G06F 9/45558* (2013.01); *G06F 21/57* (2013.01); *G06F 21/602* (2013.01); *H04L 9/30* (2013.01); *G06F 2009/45562* (2013.01)

(58) Field of Classification Search
CPC ...... G06F 21/53; G06F 9/45558; G06F 21/57; G06F 21/602; G06F 2009/45562; H04L 9/30
See application file for complete search history.

(56) References Cited

U.S. PATENT DOCUMENTS

| 9,418,040 | B2 * | 8/2016 | Cordray | H04L 41/082 |
| 9,515,997 | B1 | 12/2016 | Westman | |
| 10,621,366 | B2 * | 4/2020 | Campagna | G06F 21/602 |
| 11,258,773 | B2 * | 2/2022 | Caceres | H04L 63/0853 |
| 11,314,888 | B2 * | 4/2022 | Chen | H04L 9/0819 |
| 11,329,980 | B2 * | 5/2022 | Callahan | H04L 63/0823 |
| 11,444,765 | B2 * | 9/2022 | Nirwal | H04L 63/068 |
| 11,502,994 | B2 * | 11/2022 | Vemulpali | H04L 9/30 |

(Continued)

FOREIGN PATENT DOCUMENTS

| IN | 201941012649 A | 2/2020 |
| WO | 2018007213 A1 | 1/2018 |

OTHER PUBLICATIONS

International Search Report and Written Opinion, International Application No. PCT/CN2022/103239, International Filing Date Jul. 1, 2022.

(Continued)

*Primary Examiner* — Hosuk Song
(74) *Attorney, Agent, or Firm* — Heather Johnston

(57) ABSTRACT

A system may include a memory and a processor in communication with the memory. The processor may be configured to perform operations that include generating a key pair and encrypting a data credential with a public key to make a data credential secret. The operations may further include storing the data credential secret in a cluster on a host and deploying a workload on the cluster. The operations may also include establishing an empty bundle in the host and generating a pod trusted execution environment.

20 Claims, 7 Drawing Sheets

(56) References Cited

U.S. PATENT DOCUMENTS

| | | | |
|---|---|---|---|
| 11,658,956 B2* | 5/2023 | Mathaiyan | G06F 21/44 |
| | | | 713/168 |
| 2004/0168081 A1 | 8/2004 | Ladas | |
| 2018/0137299 A1 | 5/2018 | Porter | |
| 2020/0082071 A1 | 3/2020 | Cherny | |
| 2020/0412540 A1 | 12/2020 | Sabath | |

OTHER PUBLICATIONS

Agarwal, Gaurav. "Encrypting Kubernetes Secrets With Sealed Secrets." Published Jun. 15, 2020. 12 pages. Published by Better Programming. https://betterprogramming.pub/encrypting-kubernetes-secrets-with-sealed-secrets-fe363149a211.

Anonymous. "Container Image Protection." Printed Jun. 20, 2021. 3 pages. Published by Oracle. https://oracle.github.io/weblogic-kubernetes-operator/security/domain-security/image-protection/.

Anonymous. "Encrypting images for content confidentiality in IBM Cloud Container Registry." Printed Jun. 18, 2021. 7 pages. Published by IBM. https://cloud.ibm.com/docs/Registry?topic=Registry-registry_encrypt.

Anonymous. "Protecting secrets in Docker environments." Published Jul. 20, 2020. 6 pages. Published by IP.com. https://priorart.ip.com/IPCOM/000262988.

Anonymous. "TEE-based confidential computing." Published Jun. 1, 2021. 7 pages. Published by Alibaba Cloud. https://www.alibabacloud.com/help/doc-detail/164536.htm.

Gowda, et al., "Confidential Containers." Published Feb. 11, 2020. 7 pages. Published by Microsoft. https://docs.microsoft.com/en-us/azure/confidential-computing/confidential-containers.

Joseph, Elizabeth. "Technical overview of Secure Execution for Linux on IBM Z." Published Apr. 14, 2020. 5 pages. Published by IBM. https://developer.ibm.com/blogs/technical-overview-of-secureexecution-for-linux-on-ibmz/?mhsrc=ibmsearch_a&mhq=secure%20execution.

Lum, Brandon. "Advancing container image security with encrypted container images." Published Apr. 23, 2020. 7 pages. Published by IBM. https://developer.ibm.com/technologies/containers/articles/advancing-image-security-encrypted-container-images/.

Mell, et al., "The NIST Definition of Cloud Computing," Recommendations of the National Institute of Standards and Technology, U.S. Department of Commerce, Special Publication 800-145, Sep. 2011, 7 pgs.

Tao, Peng (Bergwolf). "image pulling inside sandbox." Published Feb. 25, 2020. Printed Jul. 16, 2021. 16 pages. Published by Github. https://github.com/kata-containers/kata-containers/issues/149.

* cited by examiner

OPEN-SOURCE CONTAINER DATA MANAGEMENT

BACKGROUND

The present disclosure relates to digital storage management and more specifically to open-source container data management.

Cloud computing increasingly implements container systems for deployment. Open-source container environments offer adaptive load balancing, service registration, deployment, operation, resource scheduling, and capacity scaling. An open-source container cluster employs nodes, and the nodes may pull and retain data to use the data.

SUMMARY

Embodiments of the present disclosure include a system, method, and computer program product for image management in an open-source container system.

A system in accordance with the present disclosure may include a memory and a processor in communication with the memory. The processor may be configured to perform operations that include generating a key pair and encrypting a data credential with a public key to make a data credential secret. The operations may further include storing the data credential secret in a cluster on a host and deploying a workload on the cluster. The operations may also include establishing an empty bundle in the host and generating a pod trusted execution environment.

In some embodiments of the present disclosure, the operations may include submitting a data pull request with an encrypted data pull credential and decrypting the data credential secret with a private key to generate decrypted data in the pod trusted execution environment. In some embodiments, the operations may further include forwarding the data pull request to the pod trusted execution environment with a shim. In some embodiments, the operations may further include submitting the decrypted data to a CRI image service within the pod trusted execution environment.

In some embodiments of the present disclosure, the operations may include calling a CRI-runtime-service to generate a real container bundle and launching the real container bundle. In some embodiments, the operations may include decrypting, in the real container bundle, the data credential secret.

In some embodiments of the present disclosure, the operations may include receiving a container request and receiving a pull data request with the data credential secret.

In some embodiments of the present disclosure, the data credential may be an image credential.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
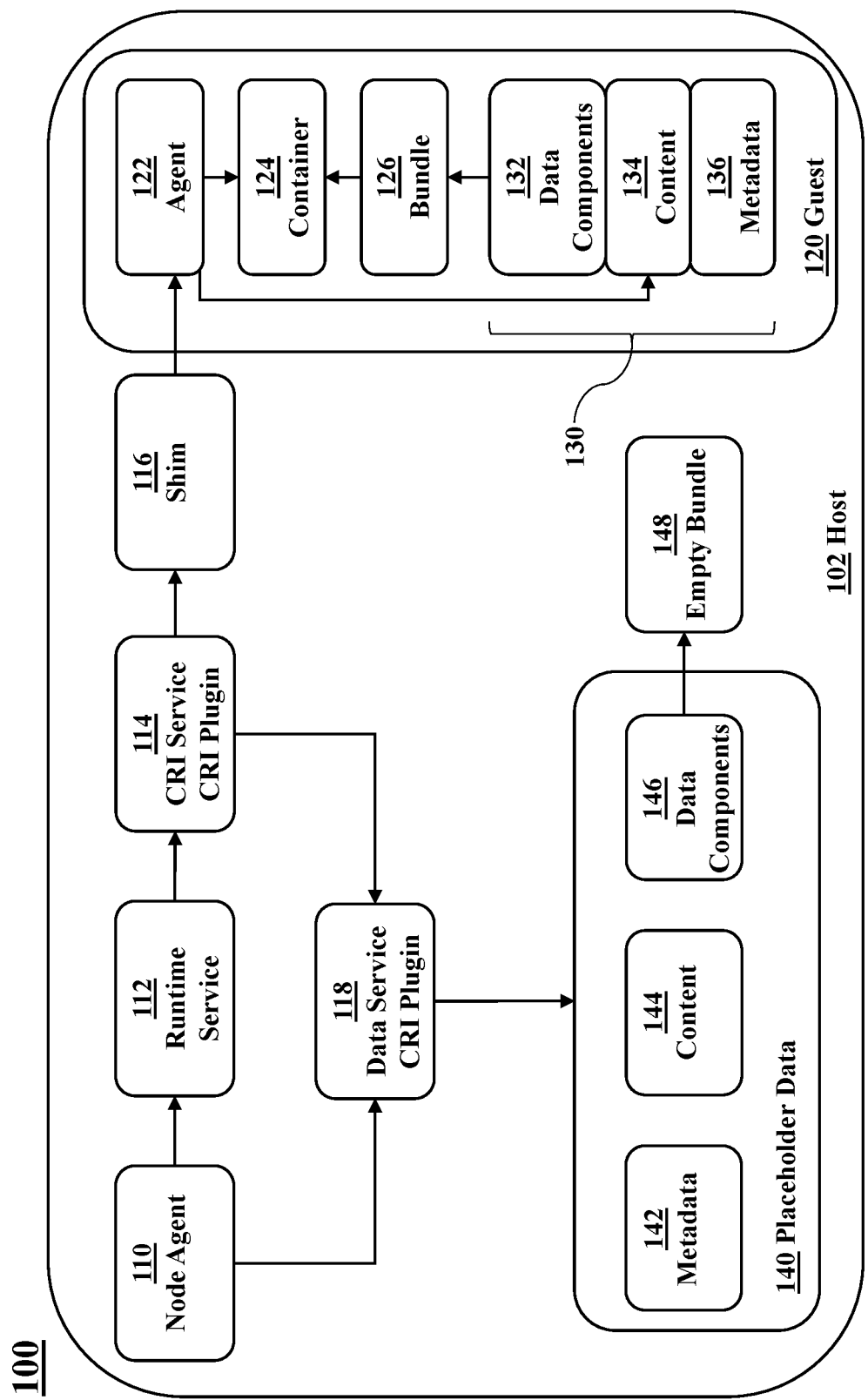
FIG. 1 illustrates a data management system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital storage management and more specifically to open-source container image management.

An open-source container system may include use of a container runtime interface (CRI) to manage data held by or used in the system. Workload images, for example, may be pulled into a worker node for use in a container. The data (such as workload images) may be accessed directly in a worker host by workloads in other containers without a security checkpoint between containers. Sensitive data (e.g., information about a user such as the information in an image of the user) may be exposed to unauthorized entities. Further, data may simply be base64 encoded when stored to etcd in the open-source container cluster such that the information may be viewed by other containers or administrators of the open-source container cluster. As a result, users may be deterred from storing their data on a host.

The present disclosure provides a data management system and method for use in an open-source container cluster to protect workload data and maintain the privacy of data pulls. Various types of data may be managed in accordance with the present disclosure such as documents, spreadsheets, code files, databases, images, and the like. In some embodiments of the present disclosure, the managed data may include one or more managed images.

Open-source container data management may pull the workload data by CRI such that all data is pulled to worker node. For example, images may be saved to a k8s.io namespace if an end user uses containerd as the backend service, and the images can be accessed directly in worker hosts. This mechanism lacks security, and some users may not want to save container image data on a worker host as a result of the lack of security. Data pull secrets (in the aforementioned example, image pull secrets) may only be base64 encoded and then stored to etcd in a cluster; as a result, the data can be viewed by administrators of the cluster or from other containers in the pod.

In accordance with the present disclosure, an end user may store data to a trusted virtual machine (VM) to protect the data pull secret; the data pull secret may be encrypted before using and can only be decrypted in the trusted VM. The end user may run a workload on the trusted VM while protecting the data and providing security for the data.

A system in accordance with the present disclosure may include a memory and a processor in communication with the memory. The processor may be configured to perform operations that include generating a key pair and encrypting a data credential with a public key to make a data credential secret. The operations may further include storing the data credential secret in a cluster on a host and deploying a workload on the cluster. The operations may also include generating an empty bundle in the host and generating a pod trusted execution environment.

In some embodiments of the present disclosure, the operations may include submitting a data pull request with an encrypted data pull credential and decrypting, in the pod trusted execution environment, the data credential secret with a private key to generate decrypted data. In some embodiments, the operations may further include forwarding the data pull request to the pod trusted execution environment with a shim. In some embodiments, the operations may further include submitting the decrypted data to a CRI image service within the pod trusted execution environment.

In some embodiments of the present disclosure, the operations may include calling a CRI runtime service to generate a real container bundle and launching the real container bundle. In some embodiments, the operations may include decrypting, in the real container bundle, the data credential secret.

In some embodiments of the present disclosure, the operations may include receiving a container request and receiving a pull data request with the data credential secret.

In some embodiments of the present disclosure, the data credential may be an image credential.

FIG. 1 illustrates a data management system 100 in accordance with some embodiments of the present disclosure. The data management system 100 includes a host 102, a guest 120, placeholder data 140, and other components that interact therewith.

The host 102 may have a node agent 110 (e.g., a kubelet) that communicates with a runtime service 112 and a data service CRI plugin 118. The runtime service 112 may communicate with a CRI service CRI plugin 114, and the CRI service CRI plugin 114 may communicate with the data service CRI plugin 118 and a shim 116.

The data service CRI plugin 118 may generate and/or communicate with placeholder data 140. The placeholder data 140 may be information satisfactory to fulfill cluster application programming interface (API) requirements. The placeholder data 140 may be stock or other information either related or unrelated to the content data 130 to be stored on the cluster such that the host 102 may properly prepare for the content data 130 while preserving the privacy and security of the content data 130. The placeholder data 140 may include metadata 142, content 144, and/or data components 146 (e.g., snapshots for images or pages of documents).

The data components 146 may communicate with an empty bundle 148 on the host 102. The empty bundle 148 may exist on the host independent of direct communication with other objects on the host 102. For example, whereas some methods of data management may have a bundle communicating with the CRI service CRI plugin 114 and/or the guest 120 or a subcomponent thereof, according to the present disclosure, the empty bundle 148 may be independent of both the CRI service CRI plugin 114, the guest 120, and subcomponents thereof.

The shim 116 may communicate with the guest 120 via an agent 122. The agent 122 may generate a container 124 and communicate with content data 130 to be stored in accordance with the present disclosure. The content data 130 may include, for example, data components 132, content 134, and metadata 136. The agent 122 may communicate directly with content 134 within the content data 130. The content data 130 may prompt the generation of a bundle 126 on the guest 120, and the bundle 126 may communicate with the container 124 in communication with the agent 122.

In some embodiments, a user may generate a key pair and encrypt a docker image secret using the public key in the key pair. The user may store the encrypted image pull secret to the cluster and configure the cluster to use a trusted image service. The user may deploy a workload normally, and the trusted image service may generate fake container image data in the host and cache the related pull image request in memory. The trusted VM shim plugin may query the new VM image service to get the related pull image request in memory. The trusted VM shim plugin may call the trusted VM service to generate a trusted VM, and the private key may be stored in the trusted VM such that no entity may access the trusted VM directly. The trusted VM shim plugin may forward the pull image request to the trusted VM. In the trusted VM, the encrypted image pull secret may be decrypted using the private key of the key pair. The container image data may be pulled to the trusted VM, and the trusted VM shim plugin may generate a container with the pulled container image.

Figure 2:
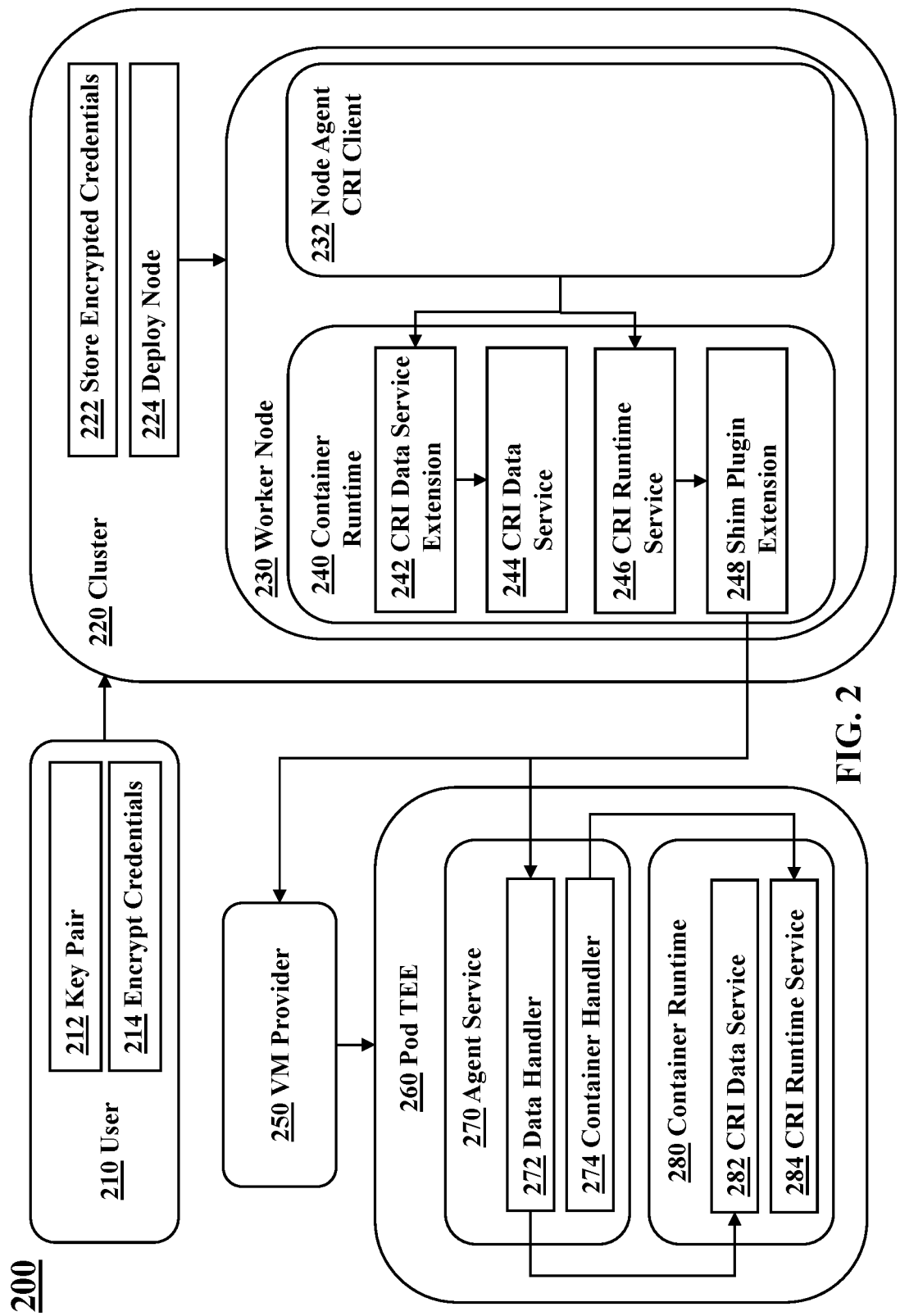
FIG. 2 depicts a data management system in accordance with some embodiments of the present disclosure.

FIG. 2 depicts a data management system 200 in accordance with some embodiments of the present disclosure. The data management system 200 may include submissions from a user 210, a cluster 220, a VM provider 250, and a pod trusted execution environment 260.

Submissions from a user 210 may include a key pair 212 and encrypted credentials 214. The user may submit the key pair 212 and the encrypted credentials 214 to a cluster 220. The cluster 220 may be any container cluster, including an open-source container cluster such as a Kubernetes® cluster (which may also be referred to as a k8s® cluster), an open shift cluster, or other container cluster. The cluster 220 may store 222 the encrypted credentials 214 and deploy 224 a worker node 230.

The worker node 230 may include a node agent CRI client 232 and a container runtime 240. The node agent CRI agent 232 may be, for example, a kubelet CRI agent or similar server process. The container runtime 240 may include a CRI data service extension 242, a CRI data service 244, a CRI runtime service 246, and a shim plugin extension 248. The node agent CRI client 232 may communicate with the CRI data service extension 242 and the CRI runtime service 246.

The CRI data service extension 242 may cache the encrypted credentials 214 and generate an empty container request in the host. The shim plugin extension 248 may receive the generated empty container request; the shim plugin extension 248 may also receive any data pull requests with the encrypted credentials 214. The shim plugin extension 248 may contact the VM provider 250 and prompt the VM provider 250 to generate a pod trusted execution environment 260 in the data management system 200 external to the worker node 230 using the private key of the key pair 212. The shim plugin extension 248 may communicate with the newly generated pod trusted execution environment 260.

The pod trusted execution environment 260 may include an agent service 270 and a container runtime 280. The agent service 270 may include a data handler 272 and a container handler 274, and the container runtime 280 may include a CRI data service 282 and a CRI runtime service 284. The container handler 274 of the agent service 270 may communicate with the CRI runtime service 284 to generate a container for the storage of data, including decrypted data.

The shim plugin extension 248 in the worker node 230 may communicate with the data handler 272 in the agent service 270 of the pod trusted execution environment 260. The data handler 272 may decrypt the encrypted credentials 214 with the private key of the key pair 212. The data handler 272 may communicate with the CRI data service 282, including forwarding the decrypted data to the CRI data service 282 for secure storage within the pod trusted execution environment 260.

Figure 3:
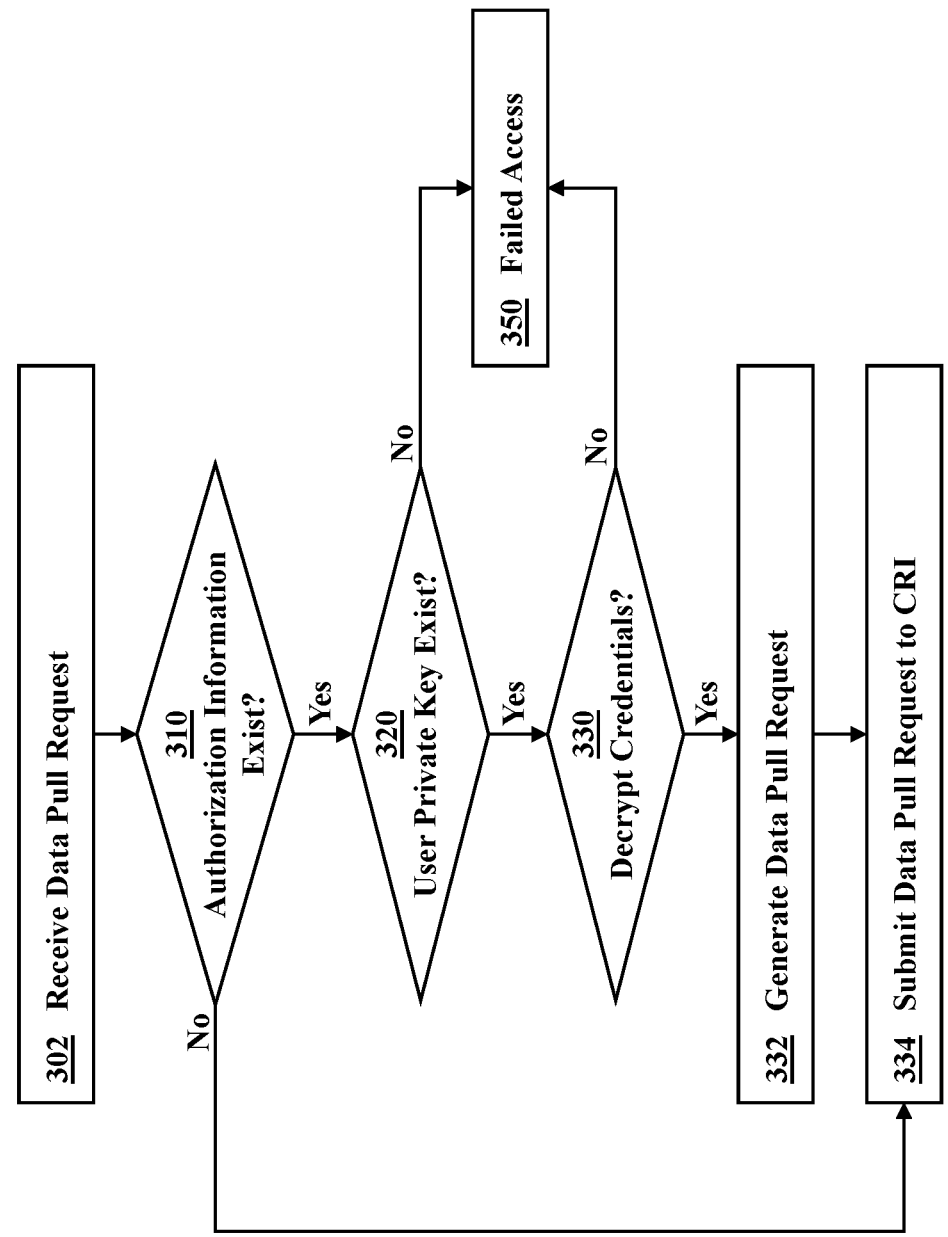
FIG. 3 illustrates a data management method in accordance with some embodiments of the present disclosure.

FIG. 3 illustrates a data management method 300 in accordance with some embodiments of the present disclosure. The data management method 300 may include receiving 302 a data pull request and identifying 310 whether the authorization information already exists. If the authorization information does not yet exist, the data pull request may be submitted 334 to the CRI. In accordance with some embodiments of the present disclosure, if the authorization information does not yet exist, access to the CRI and the data fails 350.

If the authorization information exists, the data management method 300 may continue by detecting 320 whether the user has provided a private key. If a private key is not provided, access to the data fails 350; if the correct private key is provided, the process may continue by decrypting 330 the credentials (e.g., a username and password combination) and assessing whether the credentials provided are the appropriate credentials. If the credentials are not proper, access to the data fails 350; if the credentials are proper, the process proceeds by generating 332 a data pull request using the decrypted credentials. The process may include submitting 334 the data pull request to the CRI to grant access to the encrypted data.

Figure 4:
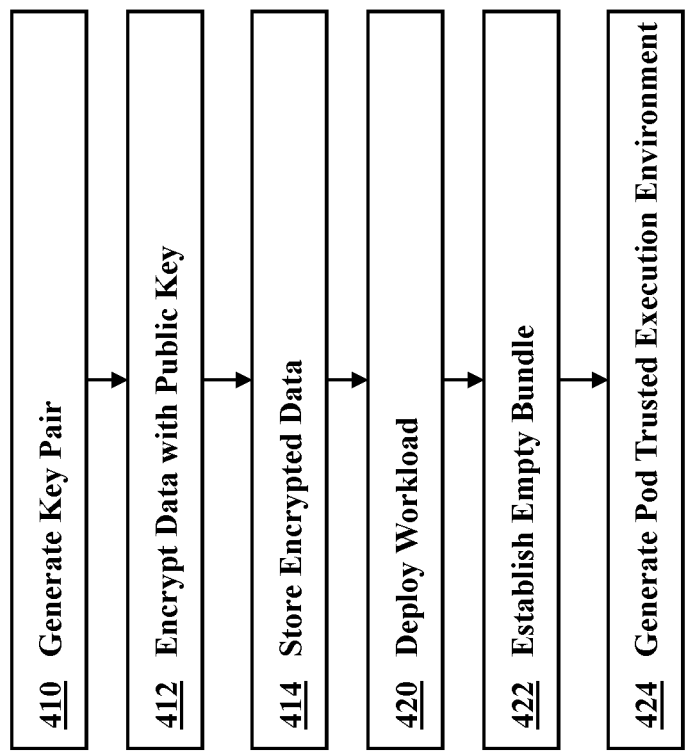
FIG. 4 depicts a data management method in accordance with some embodiments of the present disclosure.

FIG. 4 depicts a data management method 400 in accordance with some embodiments of the present disclosure. The data management method 400 may include generating 410 a key pair. The key pair may include a public key and a private key. The data management method 400 may include encrypting 412 the data to be secured using one key (e.g., the public key) of the key pair. The data management method 400 may further include storing 414 the encrypted data.

The data management method 400 may include deploying 420 a workload and establishing 422 an empty bundle. The data management method 400 may include generating 424 a pod trusted execution environment.

In some embodiments of the present disclosure, a data management method 400 may include generating 410 a key pair and encrypting 412 a data credential with a public key to make a data credential secret. The data management method 400 may further include storing 414 the data credential secret in a cluster on a host and deploying 420 a workload on the cluster. The data management method 400 may also include establishing 422 an empty bundle in the host and generating 424 a pod trusted execution environment.

In some embodiments of the present disclosure, the data management method 400 may include submitting a data pull request with an encrypted data pull credential and decrypting the data credential secret with a private key to generate decrypted data in the pod trusted execution environment. In some embodiments, the data management method 400 may further include forwarding the data pull request to the pod trusted execution environment with a shim. In some embodiments, the data management method 400 may further include submitting the decrypted data to a CRI image service within the pod trusted execution environment.

In some embodiments of the present disclosure, the data management method 400 may include calling a CRI runtime service to generate a real container bundle and launching the real container bundle. In some embodiments, the data management method 400 may include decrypting, in the real container bundle, the data credential secret.

In some embodiments of the present disclosure, the data management method 400 may include receiving a container request and receiving a pull data request with the data credential secret.

In some embodiments of the present disclosure, the data credential stored using the data management method 400 may be an image credential.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
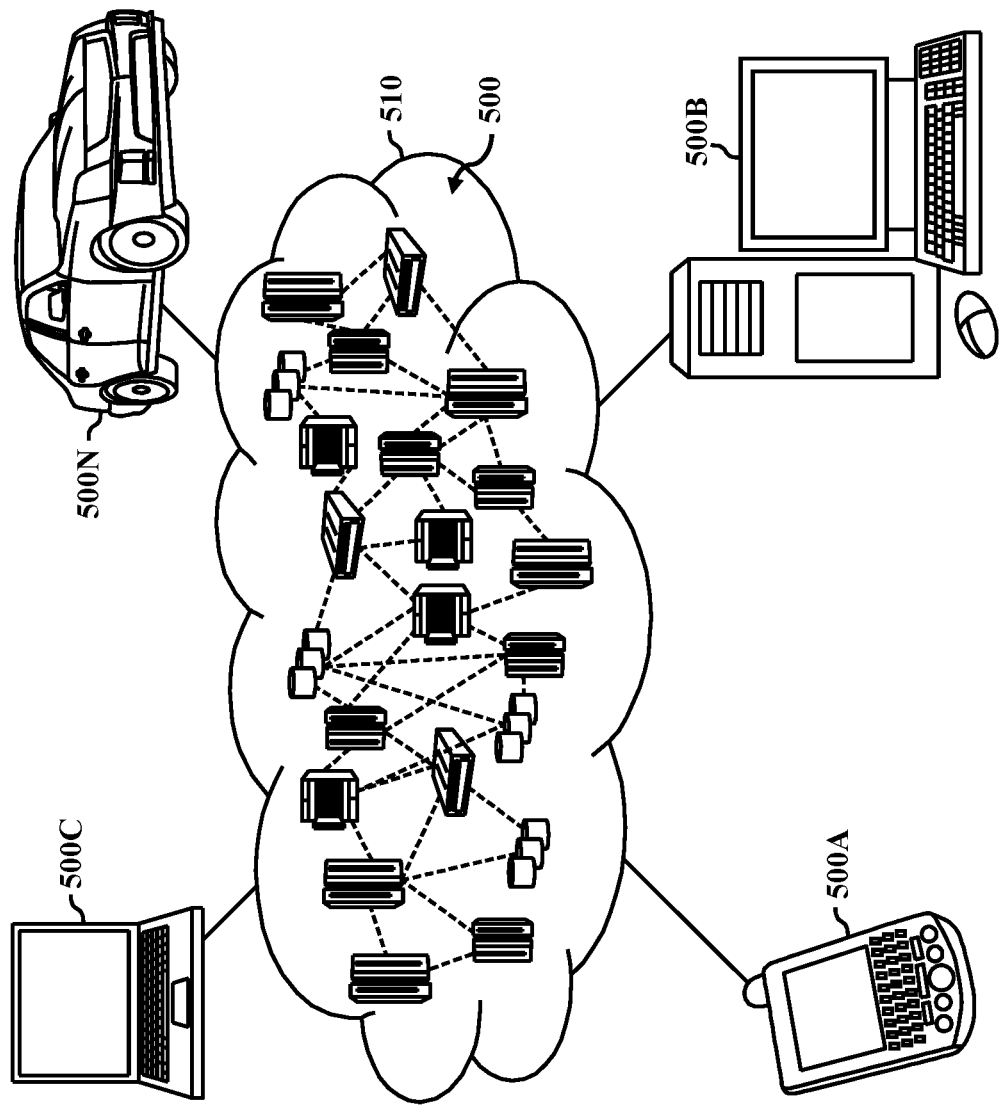
FIG. 5 illustrates a cloud computing environment in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
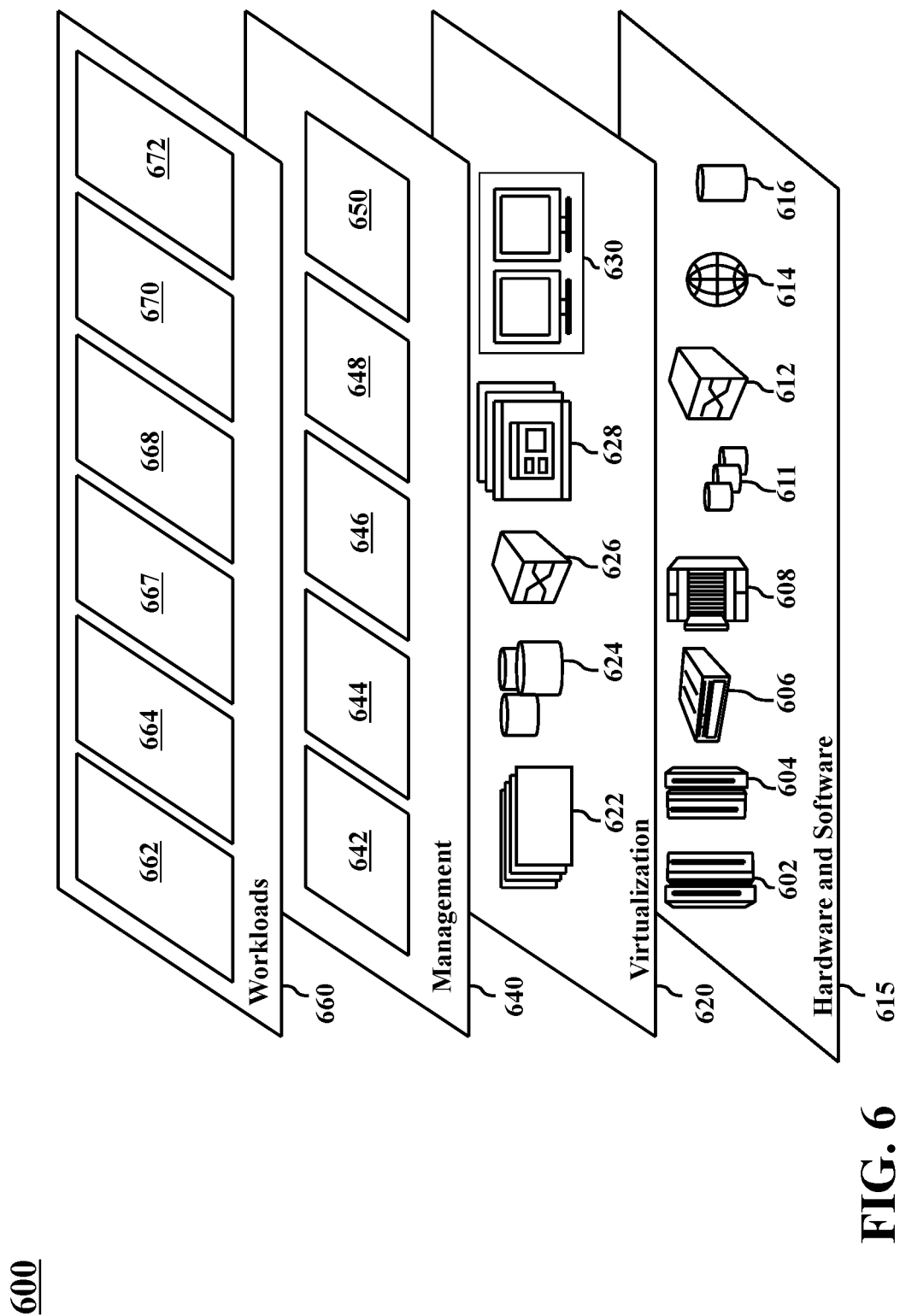
FIG. 6 depicts abstraction model layers, in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and cluster data management 672.

Figure 7:
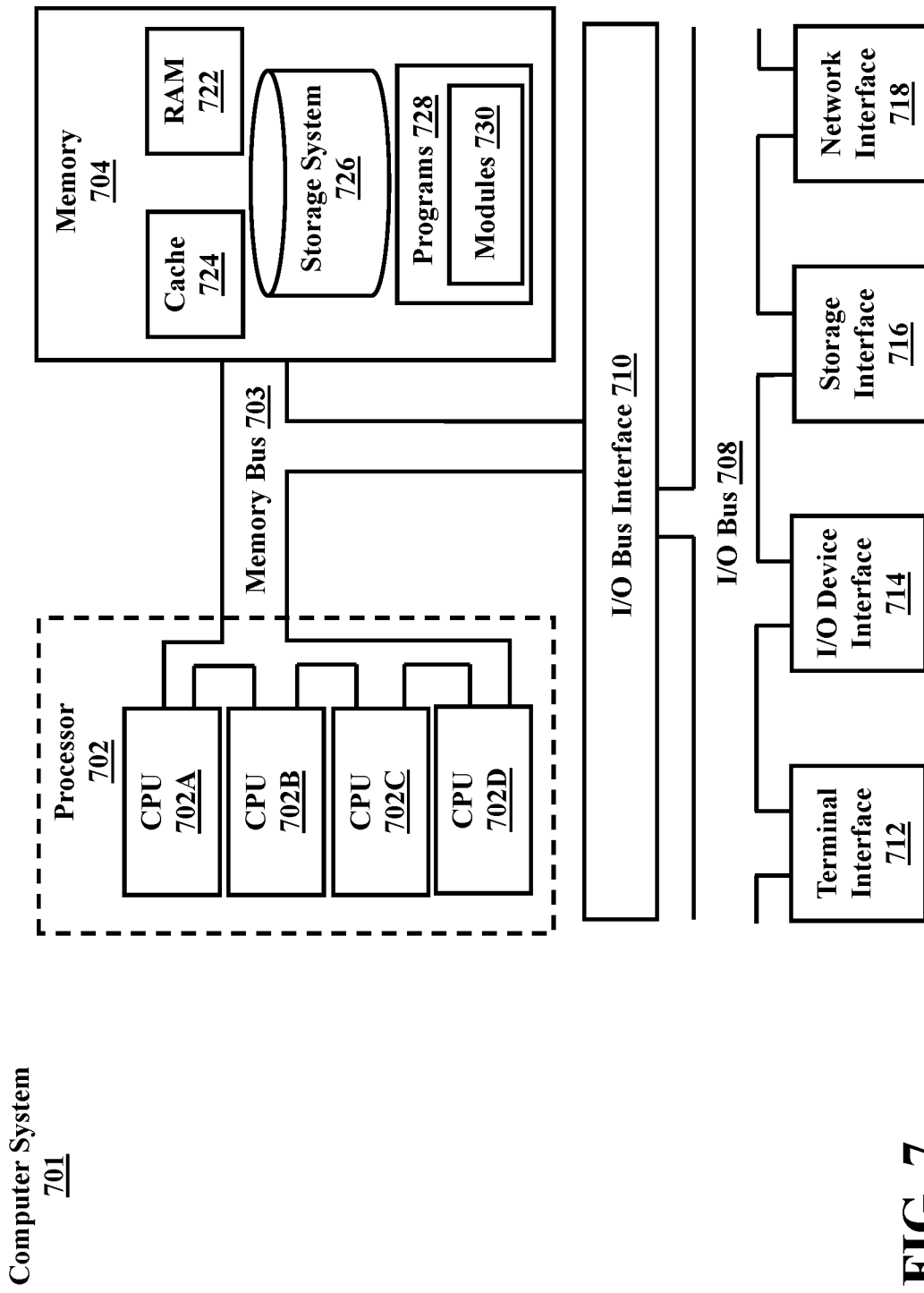
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modification thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
generating a key pair;
encrypting a data credential with a public key to make a data credential secret;
storing said data credential secret in a cluster on a host;
deploying a workload on said cluster;
establishing an empty bundle in said host;
generating a pod trusted execution environment; and
decrypting, in said pod trusted execution environment, said data credential secret with a private key to generate decrypted data.

2. The system of claim 1, further comprising:
submitting a data pull request with an encrypted data pull credential.

3. The system of claim 2, further comprising:
forwarding said data pull request to said pod trusted execution environment with a shim.

4. The system of claim 1, further comprising:
calling a CRI runtime service to generate a real container bundle; and
launching said real container bundle.

5. The system of claim 1, further comprising:
receiving a container request; and
receiving a pull data request with said data credential secret.

6. The system of claim 1, wherein:
said data credential is an image credential.

7. A method, said method comprising:
generating a key pair;
encrypting a data credential with a public key to make a data credential secret;
storing said data credential secret in a cluster on a host;
deploying a workload on said cluster;
establishing an empty bundle in said host;
generating a pod trusted execution environment; and decrypting, in said pod trusted execution environment, said data credential secret with a private key to generate decrypted data.

8. The method of claim 7, further comprising:
submitting a data pull request with an encrypted data pull credential.

9. The method of claim 8, further comprising:
forwarding said data pull request to said pod trusted execution environment with a shim.

10. The method of claim 8, further comprising:
submitting said decrypted data to a CRI image service within said pod trusted execution environment.

11. The method of claim 7, further comprising:
calling a CRI runtime service to generate a real container bundle; and
launching said real container bundle.

12. The method of claim 11, further comprising:
decrypting, in said real container bundle, said data credential secret.

13. The method of claim 7, further comprising:
receiving a container request; and
receiving a pull data request with said data credential secret.

14. The method of claim 7, wherein:
said data credential is an image credential.

15. A computer program product, said computer program product comprising a computer readable storage medium having program instructions embodied therewith, said program instructions executable by a processor to cause said processor to perform a function, said function comprising:
generating a key pair;
encrypting a data credential with a public key to make a data credential secret;
storing said data credential secret in a cluster on a host;
deploying a workload on said cluster;
establishing an empty bundle in said host;
generating a pod trusted execution environment; and
decrypting, in said pod trusted execution environment, said data credential secret with a private key to generate decrypted data.

16. The computer program product of claim 15, further comprising:
submitting a data pull request with an encrypted data pull credential.

17. The computer program product of claim 16, further comprising:
forwarding said data pull request to said pod trusted execution environment with a shim.

18. The computer program product of claim 15, further comprising:
calling a CRI runtime service to generate a real container bundle; and
launching said real container bundle.

19. The computer program product of claim 15, further comprising:
receiving a container request; and
receiving a pull data request with said data credential secret.

20. The computer program product of claim 15, wherein:
said data credential is an image credential.

* * * * *